United States Patent [19]

Sahara et al.

[11] 4,161,355
[45] Jul. 17, 1979

[54] PHOTOGRAPHIC CAMERA CONTROL CIRCUITRY

[75] Inventors: Masayoshi Sahara, Sannan; Masaaki Nakai, Nara, both of Japan

[73] Assignee: Minolta Camera Kabushiki Kaisha, Osaka, Japan

[21] Appl. No.: 875,074

[22] Filed: Feb. 3, 1978

[30] Foreign Application Priority Data

Feb. 14, 1977 [JP] Japan .................................. 52/15299

[51] Int. Cl.² .......................... G03B 7/08; G03B 9/64
[52] U.S. Cl. ................................... 354/51; 354/60 R; 354/238; 354/267
[58] Field of Search ....................... 354/24, 29, 30, 36, 354/38, 51, 60 R, 238, 258, 267, 50

[56] References Cited

U.S. PATENT DOCUMENTS

| 3,961,342 | 6/1976 | Maida | 354/60 R |
| 4,003,063 | 1/1977 | Takahashi et al. | 354/50 |
| 4,015,198 | 3/1977 | Iwashita et al. | 354/29 |
| 4,069,489 | 1/1978 | Matsuda | 354/51 |

FOREIGN PATENT DOCUMENTS

| 2517811 | 10/1975 | Fed. Rep. of Germany | 354/50 |
| 2630796 | 2/1977 | Fed. Rep. of Germany | 354/51 |

Primary Examiner—L. T. Hix
Assistant Examiner—William B. Perkey
Attorney, Agent, or Firm—Watson, Cole, Grindle & Watson

[57] ABSTRACT

In a photographic camera control circuitry which energizes an electromagnetic means for initiating a camera operation or an exposure sequence, measures brightness of the scene to be photographed and controls exposure time automatically in accordance with the scene brightness measured and stored in a storing device, a sequence control circuit arrangement includes a first energization circuit responsive to a closure of a release or trigger switch to at first energize the light measuring circuit and a delay circuit which outputs a signal after a lapse of given time from the closure of the release switch, and further includes a second energization circuit for energizing the electromagnetic means and an exposure control circuit in response to the signal from the delay circuit.

6 Claims, 1 Drawing Figure

PHOTOGRAPHIC CAMERA CONTROL CIRCUITRY

BACKGROUND OF THE INVENTION

1. Field of the Invention

The present invention relates to a control circuit for a single-lens reflex camera including an electromagnetic release mechanism and an automatic exposure control circuit having a photosensitive means receiving scene light through the objective lens of the camera (TTL light measuring system).

2. Description of the Prior Arts

One of the advantages of a camera provided with the electromagnetic release mechanism is that camera operation or exposure sequence is initiated by an actuation of a switch, so that remote control or self-timer photography can be electrically carried out without any mechanical means.

Upon employment of an electromagnetic release mechanism, however, it is not so advantageous only to utilize, in place of manual operational force exerted through the shutter release button, the electromagnetic force for the purpose of releasing a mechanical restraint on a shutter opening member, because the introduction of the electromagnet in such a manner makes the camera mechanism more complicated and brings about increase of camera size and weight, and increase of cost for manufacturing the camera.

SUMMARY OF THE INVENTION

Accordingly, the primary object of the present invention is to provide improved camera control circuitry using the property of the electromagnetic release mechanism.

Another object of the present invention is to provide a control circuit which sequentially controls energization of various electric components of the camera including the light measuring circuit, electromagnetic release circuit and exposure control circuit.

Still another object of the present invention is to provide an electric circuit arrangement for controlling circuit components of a camera exposure control circuitry wherein the exposure sequence is initiated electromagnetically and in which the output of a light measuring circuit having a photoelectric element receiving scene light through the camera objective, is stored in a storing device so that exposure time is controlled in accordance with the stored output.

To accomplish these objects, the camera control circuitry according to the present invention comprises a light measuring circuit for generating a signal representative of the brightness of a scene to be photographed with film sensitivity and other exposure factors, e.g., preset aperture value, being accounted for; a storing circuit for storing the signal from the light measuring circuit; an exposure time control circuit for initiating shutter closure in dependence on the signal stored in the storing device; switch means actuated by the operation of a shutter release button or remote controller; a first control circuit for energizing the light measuring circuit in response to the actuation of the switch means; a delay circuit responsive to the actuation of the switch means for generating an output after a lapse of a given time period from the actuation of the switch means; an electromagnetic means for actuating camera mechanism to initiate camera operation; and a second control circuit responsive to the output from the delay circuit for actuating the electromagnetic means, energizing the exposure time control circuit and disconnecting the storing circuit from the light measuring circuit; and preferably also a self-maintaining circuit for maintaining energization of the delay circuit even after the switch means are deactuated; and a release switch for deactuating or opening the self-maintaining circuit in response to the termination of the exposure.

According to the present invention, in a camera of the type provided with an automatic exposure control circuit for controlling exposure in accordance with a scene light measured through a camera objective with the measured value being stored in a storing member during shutter operation, a manual operation of a shutter release button or of any other external camera exposure initiating member, e.g., of a remote controller, actuates the light measuring circuit and the delay circuit. A short time after that, an output from the delay circuit commences energization of the electromagnets for the camera actuation and for the exposure time control, and causes the disconnection of the storing circuit from the light measuring circuit. Consequently, the energization of the light measuring circuit and the exposure time control circuit is commenced independently of the operation of mechanical parts relating to the electromagnetic release, so that interconnections between mechanical parts and electric parts may be minimized. As a result, the camera employing the present invention is easily assembled and is more reliable.

BRIEF DESCRIPTION OF THE DRAWING

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

The single FIGURE attached is a circuit diagram of a preferred embodiment according to the present invention.

DETAILED DESCRIPTION OF THE PREFERRED EMBODIMENT

Figure 1:
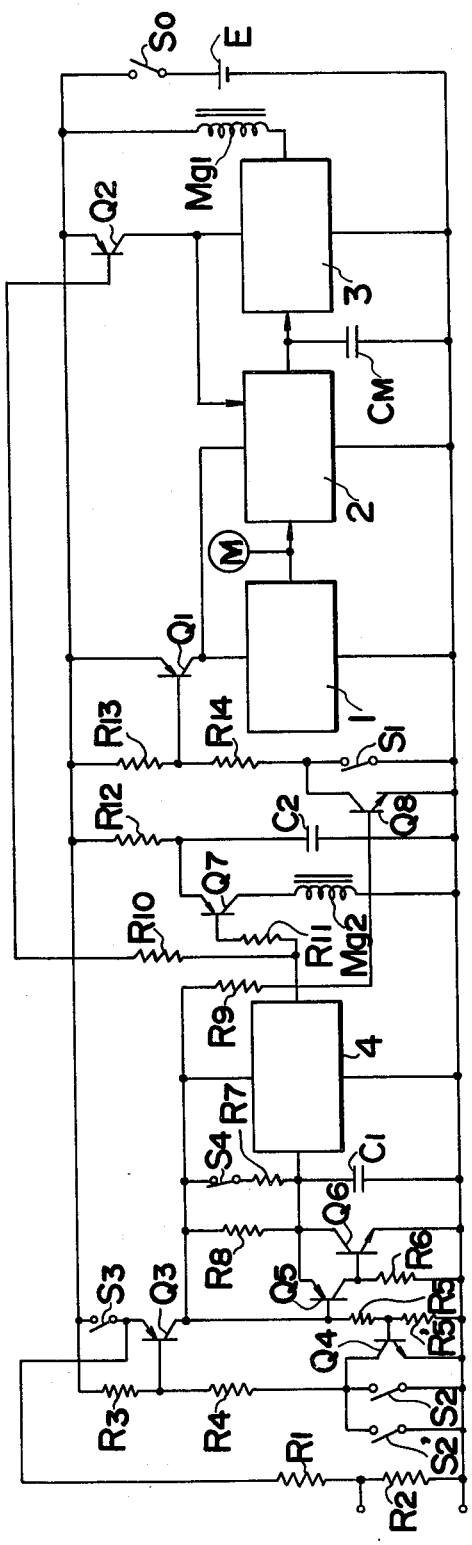

Referring to FIG. 1, light measuring circuit 1 is constructed such that it outputs a signal representative of a shutter speed suitable for the scene brightness and set exposure factors, such as film sensitivity and preset aperture value. The light measuring circuit may include a photocell adapted to receive scene light through a camera objective and a diaphragm aperture, and a logarithmic compression circuit for producing a signal proportional to the logarithm of the scene brightness measured by the photocell. The light measuring circuit may further include an electric calculation circuit for generating a time signal representative of an exposure time suitable for the scene brightness and set exposure factors, such as film sensitivity and preset diaphragm aperture value. The electric calculation circuit may carry out the calculation in accordance with the APEX system, with the signal from the logarithmic compression circuit and signals corresponding to the exposure factors.

Storing switch circuit 2 including an analogue switch is interposed between light measuring circuit 1 and storing capacitor $C_M$ to disconnect the latter from the light measuring circuit 1 at a time more fully explained hereinafter, so that the time signal may be stored in the storing capacitor $C_M$. Exposure time control circuit 3 includes an integrating circuit and a bistable threshold stage for energizing or deenergizing electromagnetic coil Mg1 to initiate shutter closing operation at a timing commensurate with the signal stored in the storing capacitor $C_M$.

It is to be noted that the above mentioned light measuring circuit 1, storing switch circuit 2 and exposure time control circuit 3 may be of a construction well known in the art and therefore a detailed explanation as well as a detailed illustration thereof is omitted.

Power source battery E supplies electric energy to light measuring circuit 1 and storing switch 2 through transistor Q1, and to exposure time control circuit 3 through transistor Q2. Transistors Q1 and Q2 are controlled by a circuit mentioned later. Switching circuit 4 includes, for example, a differential amplifier and forms a delay circuit together with resistors R7 and R8 and capacitor C1. After a lapse of a given time period from the commencement of power to the delay circuit through transistor Q3, the output level of the switching circuit 4 changes to "low" to turn on transistors Q2 and Q7. Switch S4, connected in series with resistor R7, is usually closed and opened in case of self timer photography. The time constant of the delay circuit may be about 15 m-sec. when both resistors R7 and R8 are coupled with capacitor C1 and may be about 10 sec. when only the resistor R8 is connected with the capacitor C1. The circuit consisting of transistors Q5 and Q6 and resistor R6 is disposed substantially in parallel with condenser C1 and functions to discharge the capacitor C1 when transistor Q3 is turned off.

Electromagnet Mg2 is adapted to initiate a camera operation or exposure sequence including stopping-down of a diaphragm, retraction of a reflex mirror and shutter opening, in case the circuitry of the embodiment, now being explained, is employed in a single lens reflex camera. The electromagnet Mg2 may be of the type including a permanent magnet on or in its core to attract and hold an armature which is mechanically associated with a camera mechanism, and an electromagnetic coil wound around the core to, when energized, counterbalance the attractive force of the permanent magnet to release the armature. Discharge current from the capacitor C2 which has been charged through resistor R12, is utilized for the energization of the electromagnetic coil.

Switch S1 is closed at the initial stage of depression of the shutter button to turn on transistor Q1. In place of switch S1, a so-called "touch senser switch" may be employed which closes a circuit when a finger of a user is touched to an operating portion thereof, sensing the electric conductivity of the finger or piezoelectric energy caused by the finger. When the shutter button is depressed further, switch S2 is closed causing transistor Q3 to turn on. Switch S3 is closed upon completion of shutter cocking and film wind-up operation and opened in relation to shutter opening operation. Switch S2', connected in parallel with switch S2, is operated by an external operating device such as a remote control device, that is external of or separated from the camera. Therefore, the switch S2' may be a semiconductor switch. The series circuit of resistors R1 and R2 connected between switch S3 and transistor Q3 is for supplying a signal relating to the state of switch S3, to a winder or driving mechanism (not shown) for film driving and shutter cocking by an electric motor.

Now, the operation of the above circuitry will be explained. When switch S1 is closed in relation with operation of the shutter release button, transistor S1 is turned on to energize light measuring circuit 1 and storing switch circuit 2 with the output of the light measuring circuit, i.e., the time signal, being applied to storing capacitor $C_M$ through storing switch circuit 2. Simultaneously, the time signal is supplied to an exposure time indicating means M. When the shutter button is released at this time, the switch S1 is opened and transistor Q1 is turned off.

Assuming that switch S3 has been closed previously in relation with the completion of the shutter cocking and film advancing operation, further depression of the shutter release button causes the switch S2 to close so that transistor Q3 is turned on to energize the delay circuit including switching circuit 4. The power supply to the delay circuit causes transistors Q4 and Q5 to turn on. After the transistor Q4 is turned on, transistor Q3 is maintained at the conductive state even if switch S2 is opened. Thus, the transistor Q4 serves to self-maintain the closure of the power supply circuit.

After a lapse of a specific delay time counted by the delay circuit from the closure of switch S2, the output potential of switching circuit 4 changes from "High" to "Low" to turn on transistors Q2 and Q7. As a result, exposure time control circuit 3 is supplied with electric power through the transistor Q2 and energizes electromagnetic coil Mg1 with storing switch circuit 2 being blocked to disconnect storing capacitor $C_M$ from light measuring circuit. At the same time, the electric charge on capacitor C2 is discharged through transistor Q7 and energizes electromagnet Mg2 to initiate camera operation including shutter actuation. After that exposure is effected by means of well-known mechanical operation until electromagnetic coil Mg1 is deenergized to close the shutter when an exposure time commensurate with the time signal stored in storing capacitor $C_M$ has lapsed. At this time, switch S3 is opened to open the self-maintaining circuit for the transistor Q3. The operation as explained above is performed following the operation of the shutter release button.

The following is an explanation of the operation of the present embodiment in response to the remote control means. In this case, the shutter release button is not depressed, so that switch S1 is not closed. When switch S2' is closed in response to a signal from the remote control means in the well known manner, then transistor Q3 is turned on to make transistors Q5 and Q1 conductive, so that light measuring circuit 1 and storing switch circuit 2 are supplied with electric power. After a lapse of a sufficient time period for the output of light measuring circuit 1 to be transmitted normally to storing capacitor (say, about 15 m-sec.), the delay circuit having such time constant generates an output signal to turn on transistors Q7 and Q2, thereby energizing electromagnetic coil Mg1 through exposure control circuit 3 and also energizing electromagnet Mg2 for the initiation of the exposure mechanism, with the storing switch circuit being blocked for retaining the time signal in storing capacitor $C_M$. After that substantially the same operations as that in case of the shutter release button being operated will be carried out.

It is to be understood that, in case the switch S4 is open, the electromagnet Mg2 is actuated after a duration of the time commensurate with the time constant determined by resistor R3 and capacitor C1. (Such time may be set for self-timer photography.)

Further, it should also be understood that, when transistor Q3 is conductive, transistor Q5, being reversely biased at its base, is blocked to make transistor Q6 non-conductive, thereby allowing capacitor C1 to be charged through resistor R8 or through the parallel connection of resistors R8 and R7. When transistor Q3 restores the blocked condition with the capacitor C1 having been charged, the electric charge on the capacitor C1 is discharged through the collector of transistors Q5 and Q6 as well as through the emitter-base of transistor Q5, resistors R5 and R5' and switching circuit 4.

From the terminal tapped from the common connecting point between resistors R1 and R2 is output a signal which varies in accordance with the state of the switch S3 in the manner that the signal varies from "High" to "Low" upon termination of exposure or shutter closure and vice versa upon completion of shutter cocking. Accordingly, an automatic film wind-up device may be associated with the signal such that a driving motor is activated to advance the film when the signal turns from "High" to "Low." If switch S2 is maintained closed by the continuous depression of the shutter release button, successive photography will be carried out. If the shutter release button is released in this case, the driving system will stop upon completion of film wind-up.

While the described embodiment represents the preferred form of the present invention, it is to be understood that modifications will occur to those skilled in that art without departing from the spirit of the invention. The scope of the invention is therefore to be determined solely by the appended claims.

What is claimed is:

1. A photographic camera control circuitry comprising:
    a light measuring circuit for generating a light representative signal, said light measuring circuit including a photocell receiving light of the scene to be photographed, through a camera objective and a diaphragm aperture;
    storing means for storing said light representative signal;
    storage switch means for connecting and disconnecting said storing means to or from said light measuring circuit;
    exposure time control means for initiating shutter closing at a time commensurate with the signal stored in said storing means;
    a first control circuit for energizing said light measuring circuit and actuating said storage switch means to connect said storing means to said light measuring circuit;
    a second control circuit for energizing said exposure time control means and for deactuating said storage switch means to disconnect said storing means from said light measuring circuit;
    delay means for generating an output after a lapse of a given time period from the actuation thereof;
    electromagnetic means for actuating a camera mechanism to initiate an exposure sequence;
    a third control circuit for energizing said electromagnetic means;
    a first switch means for actuating said first control circuit; and
    second switch means for actuating said first control circuit and said delay means, said delay means being connected with said second and third control circuits so that both said circuits are actuated in response to the output of said delay means.

2. The photographic camera control circuitry as set forth in claim 1 further comprising a self-maintaining circuit for maintaining energization of said delay circuit even after said first switch means are deactuated; and
    release means for opening said self-maintaining circuit in response to a termination of exposure.

3. The photographic camera control circuitry as set forth in claim 2 wherein said second switch means is responsive to operation of a shutter release button.

4. The photographic camera control circuitry as set forth in claim 2 further comprising third switch means responsive to an operation of a remote controller.

5. The photographic camera control circuitry as set forth in claim 2 wherein said release means includes a fourth switch closeable in response to completion of shutter cocking and openable in response to termination of shutter operation.

6. The photographic camera control circuitry as set forth in claim 3 wherein said self-maintaining circuit includes a biasing member connected in series with said second switch means, a first transistor having its base connected with said biasing member to be biased thereby, and a second transistor having its base connected to said first transistor to be energized thereby and having its emitter-collector connected in parallel with said second switch means.

* * * * *